(12) United States Patent
Tadmor

(10) Patent No.: US 8,447,531 B2
(45) Date of Patent: May 21, 2013

(54) DEVICE FOR MEASURING RETENTION FORCE

(76) Inventor: Rafael Tadmor, Beaumont, TX (US)

( * ) Notice: Subject to any disclaimer, the term of this patent is extended or adjusted under 35 U.S.C. 154(b) by 219 days.

(21) Appl. No.: 12/901,615

(22) Filed: Oct. 11, 2010

(65) Prior Publication Data

US 2011/0118993 A1   May 19, 2011

Related U.S. Application Data

(60) Provisional application No. 61/261,309, filed on Nov. 14, 2009.

(51) Int. Cl.
*G01L 1/00* (2006.01)

(52) U.S. Cl.
USPC ............................................................ 702/41

(58) Field of Classification Search
USPC ............................................................ 702/41
See application file for complete search history.

(56) References Cited

U.S. PATENT DOCUMENTS

2009/0110516 A1 *   4/2009   Hasegawa et al. .............. 412/13

* cited by examiner

*Primary Examiner* — Tung S Lau
(74) *Attorney, Agent, or Firm* — Oakwood Law Group, LLP; Jie Tan

(57) ABSTRACT

A Centrifugal Adhesion Balance apparatus for measuring retention forces between a body and a surface. This CAB apparatus decouples the normal and lateral retention forces by allowing any combination of the gravity force and a centrifugal force. This CAB apparatus includes a rotatable arm and an independently rotatable flat surface wherein the angle between the arm and the flat surface is precisely controlled.

9 Claims, 6 Drawing Sheets

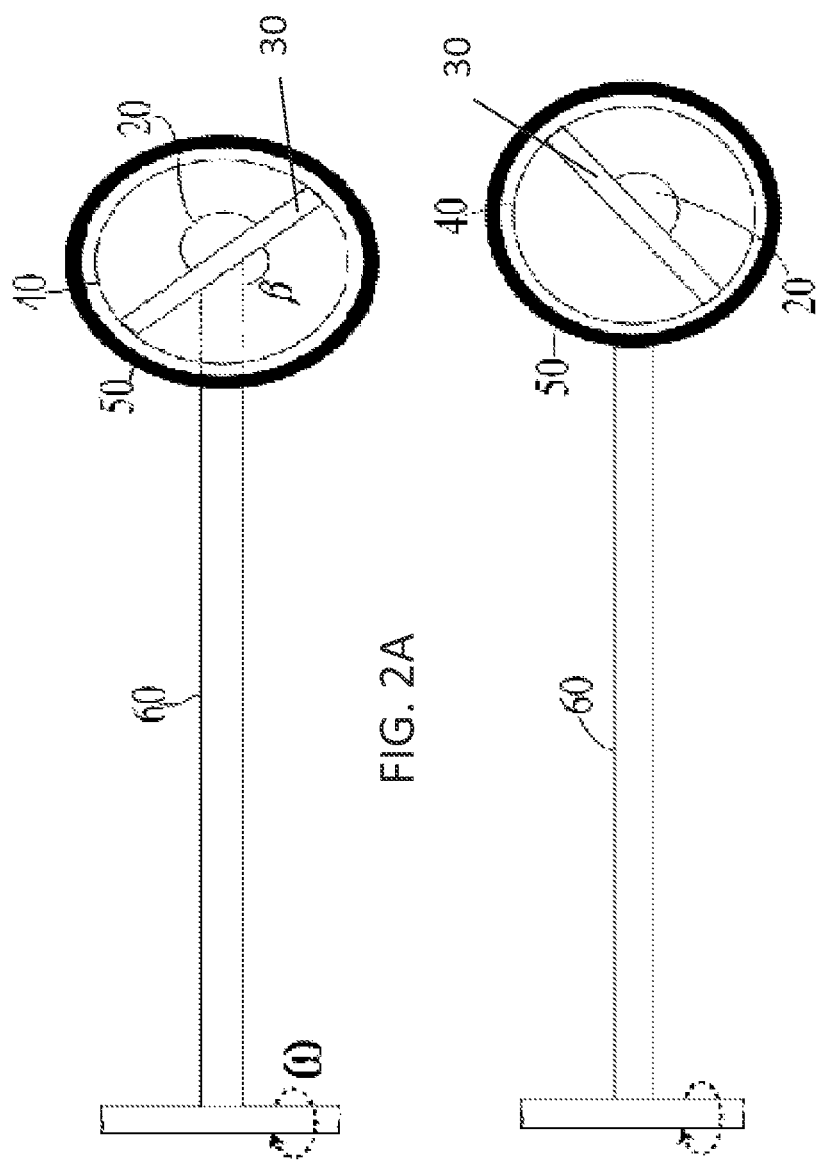

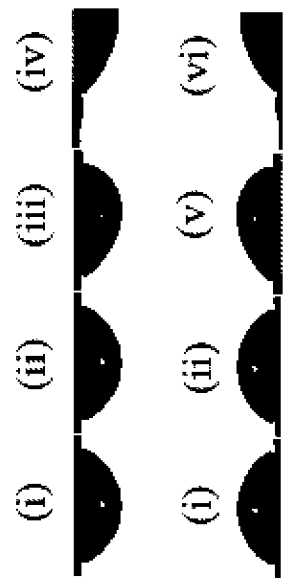
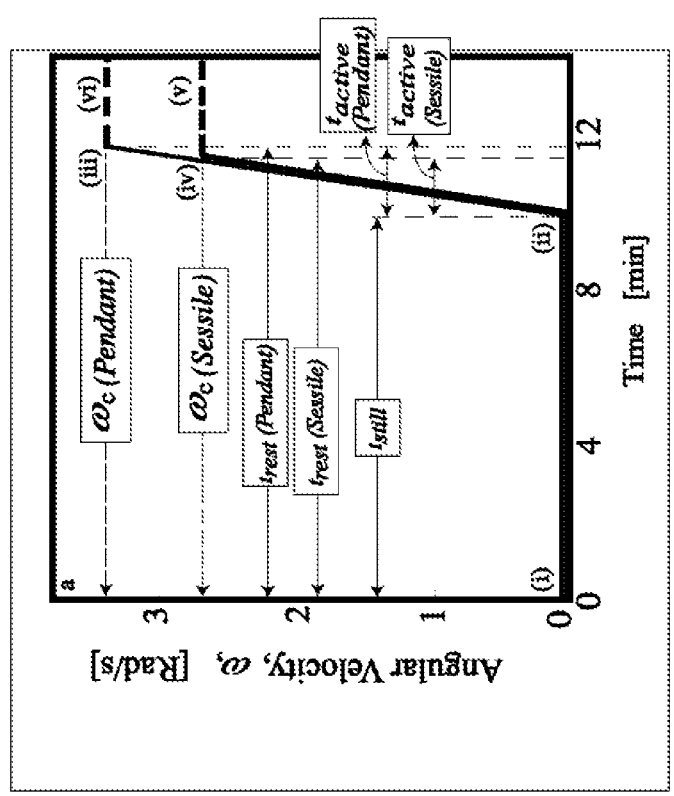
FIG. 4B
FIG. 4A

DEVICE FOR MEASURING RETENTION FORCE

CROSS REFERENCE

Priority is claimed from the U.S. Provisional Application No. 61/261,309 filed on Nov. 14, 2009, the entirety of which is hereby incorporated by reference.

DESCRIPTION OF RELATED ART

The present application relates to a device for measuring retention force, and more particularly to a device that decouples the normal and the lateral retention force upon an object, and measures these two forces separately.

Note that the points discussed below may reflect the hindsight gained from the disclosed inventions, and are not necessarily admitted to be prior art.

Retention forces are forces required to retain something onto something else, for example, retain a drop on a surface. Such forces are currently measured using a "tilt stage" method which is commercially available. The tilt stage is used for measuring lateral retention forces, a specific case of which is known as shear forces.

The tilt stage method generally consists of a stage that can be tilted. During a measurement an object (often a liquid drop) is placed on a surface which is fixed to a tilt stage and the stage is tilted until the object starts sliding down. From the angle of tilt one can calculate the lateral force required for the slide. There are two problems with tilt stage: (1) it can induce forces that are at maximum as strong as the object's weight; (2) as the tilt is increased the lateral force is varied at the same time as the normal force is varied. And the second problem violates a basic principle in experimental science, namely change one variable at a time.

Another common way for measuring shearing force is through measuring an angle deviation between two concentric shafts, of which the outer is driven with a constant rotational speed and the inner, which is influenced by the torque of resistance via the measuring body, is elastically connected to the outer one. The angle deviation occurring between the two shafts is a function of the torque on the measuring body. An example of such device is described in the US Patent Application US 2007/0277595 A1. But this is a relatively complex system and various feedback sensors are needed.

SUMMARY

The present application discloses new and simple centrifugal apparatus for measuring retention forces that decouples the normal and the lateral forces effectuated on an object. Instead of just tilting the measuring stage, the apparatus combines gravitational and centrifugal forces to allow any combination of normal and lateral retention forces for the calculation of normal and lateral retention forces and their relationship.

In one embodiment, the apparatus comprises a Centrifugal Adhesion Balance (CAB) assembly that includes a single rotating arm connected with a rotatable sample chamber. The rotating of the arm and the tilting angle of the sample chamber in relation to the arm are precisely controlled.

In one embodiment, the apparatus includes a camera, a recording system and a transmitting system for monitoring the object placed on the chamber to be measured.

In one embodiment, observations and recordings of the object to be measured are wireless transmitted to a computer for analysis.

The disclosed innovation, in various embodiments, in a much simplified structure, provides a simple way in theory and in practice for measuring and analyzing retention forces in terms of normal force and lateral force respectively, allowing scientists and engineers to reach much more meaningful experiment results and conclusions, sometimes surprising results.

BRIEF DESCRIPTION OF THE DRAWINGS

The disclosed invention will be described with reference to the accompanying drawings, which show important sample embodiments of the invention and which are incorporated in the specification hereof by reference, wherein:

FIGS. 2A and 2B shows a sectional view of an example Centrifugal Adhesion Balance (CAB) assembly in accordance with this application.

FIGS. 4A and 4B demonstrates an example experiment by varying the angular velocity of the rotating arm of CAB.

DETAILED DESCRIPTION OF SAMPLE EMBODIMENTS

Figures 1A, 1B:
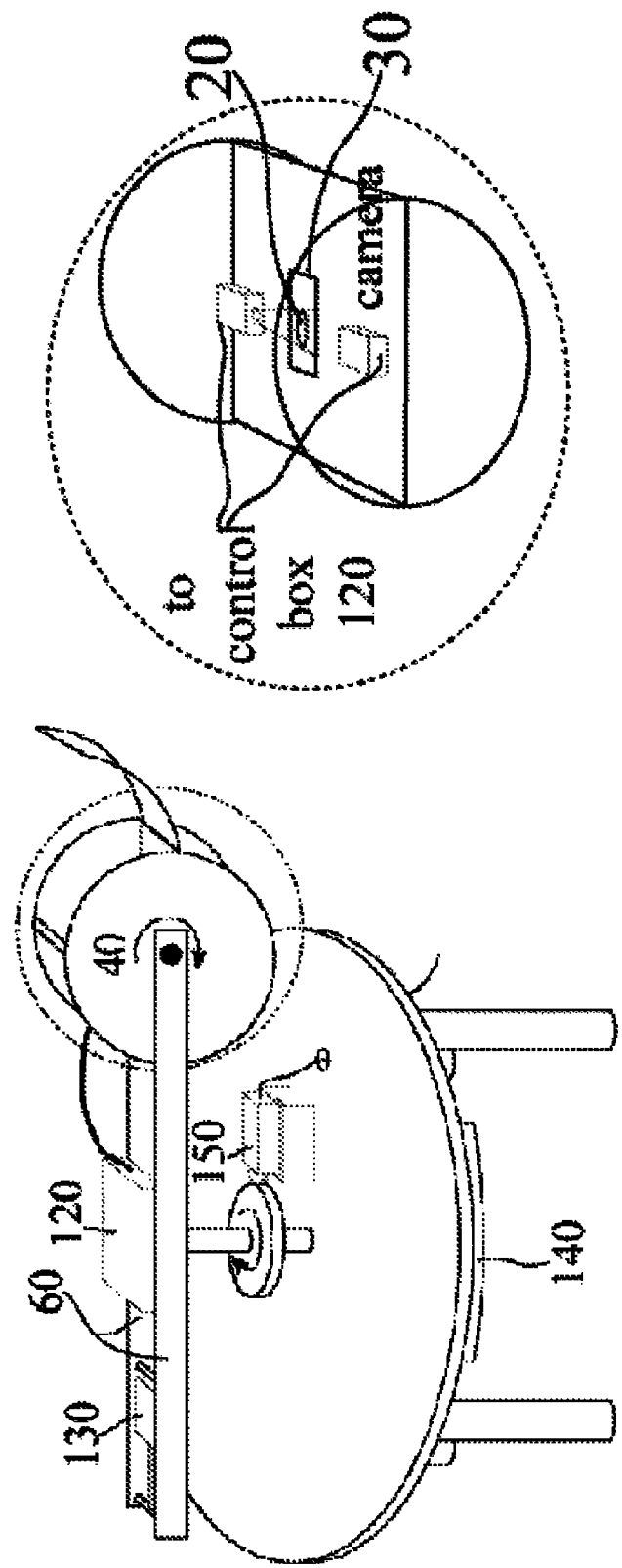
FIG. 1A schematically shows a perspective view of an example Centrifugal Adhesion Balance apparatus in accordance with this application.
FIG. 1B shows a perspective view of an example chamber structure in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

It is contemplated and intended that the design and structure described in this application be made of any suitable material, based on prior art and commercial available products, for example, steel and plastics.

Unless otherwise defined, all technical and scientific terms used herein have the same meaning as commonly understood by one of ordinary skill in the art to which the inventions belongs. The methods and examples provided herein are illustrative only and not intended to be limited.

In reference to FIGS. 1A, 1B, 2A and 2B, a novel instrument named here Centrifugal Adhesion Balance (CAB) apparatus is shown. The CAB is an instrument for measuring retention forces, and it performs retention force measurement in a way that decouples the normal and the lateral forces. It may be the first instrument to enable such decoupling for retention forces.

In effecting retention forces two bodies or surfaces are involved, one resting on or adhering to another. In the CAB one of the bodies or surfaces is fixed to a rotating plate which in turn is fixed to a rotating arm. This body is called "surface" (not "body" though it is) because in most cases it may have the shape of a rather flat surface. The other body (for example this can be a water drop) is resting on the surface or adhering to the surface. The other body is called "body" or surface "body" (not "surface" though it has a surface).

For example, "body" 20 is placed on "surface" 30 which in turn is placed on a plate that is attached to an inner cylinder 40. The inner cylinder 40 can be tilted with respect to an outer cylinder 50 allowing complete 360° freedom for tilt angles so that the normal force emanating from gravity changes with the tilt. The outer concentric cylinder 50 is fixed to an arm 60 that can rotate 360° parallel to the earth and perpendicular to the rotation of the inner cylinder 40, thereby the normal force emanating from gravity is not affected by rotation of arm 60.

By inducing different combinations of cylinder tilt angle $\beta$ and arm angular velocity w, as shown in FIGS. 2A and 2B, one can induce any combination of lateral force, $F\|$, and the normal force, $F\perp$, because they are different combinations of centrifugal and gravitational forces. The exact values of the resulting lateral force, $F\|$, and the normal force, $F\perp$, are given by equations 1 and 2 below:

$$F\| = m(\omega 2L \cos\beta - g \sin\beta) \quad (1)$$

$$F\perp = m(\omega 2L \sin\beta + g \cos\beta) \quad (2)$$

where L is the distance of the drop away from the center of rotation, $\beta$ is the cylinder tilt angle as shown in FIGS. 2A and 2B, w is the arm angular velocity, and g is the gravitational acceleration. By changing the angular velocity, w, and the tilt angle $\beta$, one can tune both $F\perp$ and $F\|$ to any combination. For example one can keep normal forces per mass of +g, −g by putting $\beta$ at 0° and 180° respectively and simultaneously allow any lateral force which is now only a function of $\omega$.

Figure 3:
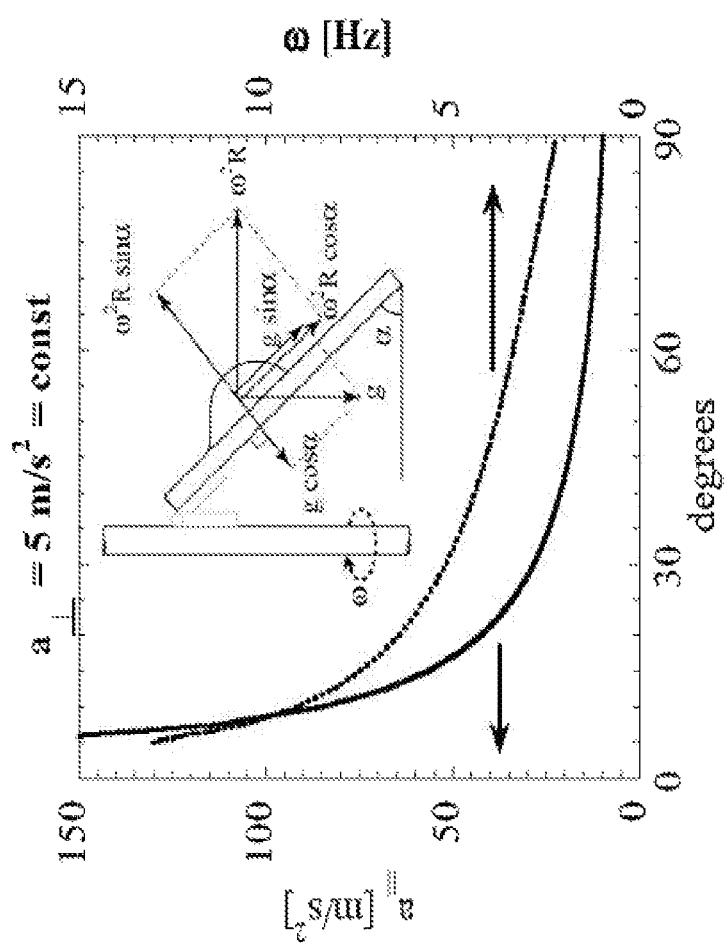
FIG. 3 shows the functional relationship between lateral force, the rotating speed and the tilt angle of the sample chamber.

For convenience of expression, tilt angle may be measured as $\alpha$ as shown in FIG. 3, then normal acceleration ($a\perp$) and lateral acceleration ($a\|$)

$$\omega 2R \sin\alpha - g \cos\alpha = a\perp \quad (3)$$

$$\omega 2R \cos\alpha + g \sin\alpha = a\| \quad (4)$$

FIG. 3 shows an example relationship between the lateral acceleration ($a\|$), the $\omega$ and $\alpha$ while maintaining a constant normal acceleration ($a\perp$) of 5 m/s2 (an arbitrary value), R=1 m. To keep $a\perp$ constant, $\alpha$ should change when the angular velocity, $\omega$, changes so that equation (3) is satisfied. FIG. 3 shows the values of $\omega$ and the resulting value of all that are required to keep $a\perp$=5 m/s2 as a function of a according to equation (3) and (4).

FIGS. 1A and 1B shows that CAB may be set up that a rotating arm 60 has a closed chamber 40 at one end and a counterbalance 130 at the other. The chamber, drawn with its door open, holds a light source and a camera between which the body (drown as a drop) is placed as shown in the right inset. The signal from the camera is transferred to a control box 120 which runs on battery and which further transfers the signal wirelessly to a computer placed nearby outside the rotating assembly (not shown). The angular velocity is monitored using an encoder 150 that touches a round enlargement in the shaft which in turn is connected to a motor 140. The force measurements are coupled with in situ video signal of the sliding object or body (shaped as a drop in the right inset).

Although it is easier to use the CAB if there are wireless means of recording the body on the surface in real time and transferring the image to a computer nearby. This is not a requirement. Without it, one could also use the CAB, for example by stopping the centrifugal motion every time one wants to know if the body is still on the same place on the surface. Similarly, it is easier if a motor induces the centrifugal motion and if the cylinder is closed so that there is no wind that influences the motion unless one wants the wind to be part of the induced force. Another option can be a tachometer or an encoder that gives an easy reading of the number of revolutions per minute (RPM), though if the speed is slow enough one can count the number of revolutions instead. Also in FIGS. 1A and 1B instead of a bigger outer cylinder shown in FIGS. 2A and 2B, an axis (drawn as black round circle) connects the arm and the inner cylinder. This axis has the same functionality as the outer cylinder 50 of FIGS. 2A and 2B.

FIGS. 4A and 4B show one of many possible experimental procedures for using the CAB. FIGS. 4A and 4B show the procedure of a single force datum measurement using the system of hexadecane drop on a Teflon surface. A sessile drop and a pendant drop are compared using a drop on a surface when the plate tilt at values of $\alpha$=0° and $\alpha$=180°. FIG. 4B shows corresponding pictures of a hexadecane drop on a Teflon coated silicon surface inside the CAB. The curves in FIG. 4A describe the applied angular velocities, w, as a function of experiment time. This consists of the CAB 'still time', tstill, which is a prescribed time during which the centrifugal force is zero (the CAB remains still) followed by a CAB 'active time', tactive, during which w is gradually increased until, at some critical angular velocity, $\omega c$, the drop moves. Throughout this procedure, the drop is resting pinned to the surface and its onset of movement signifies the end of the active time, so the drop's resting time is the sum of the CAB still time and the CAB active time, i.e.: trest=tactive+tstill.

In FIG. 4A, the Y axis indicates the variation of the angular velocity, w, during the measurement: The drop is allowed to rest in the stationary CAB for a prescribed period, tstill, after which w is gradually increased until at a certain critical value, $\omega c$, the drop starts sliding along the surface. The drop is pinned to the surface from right after placement till just before $\omega c$ is reached; this whole time is termed trest. We consider pendant and sessile drops. In FIG. 4B, (b) and (c) correspond records of drop pictures as taken at different stages of the measurement. From (i) to (ii) no lateral force is applied and the drop is symmetric and pinned to the surface; during the active stage it is deformed as shown in (iii) but it is still pinned to the surface. Once $\omega c$ is reached the drop slides and hence in (iv) we see only part of it in the frame. We see that the lateral force required to slide the drop is higher when the normal force is lower (Pendant vs. Sessile).

Figure 5:
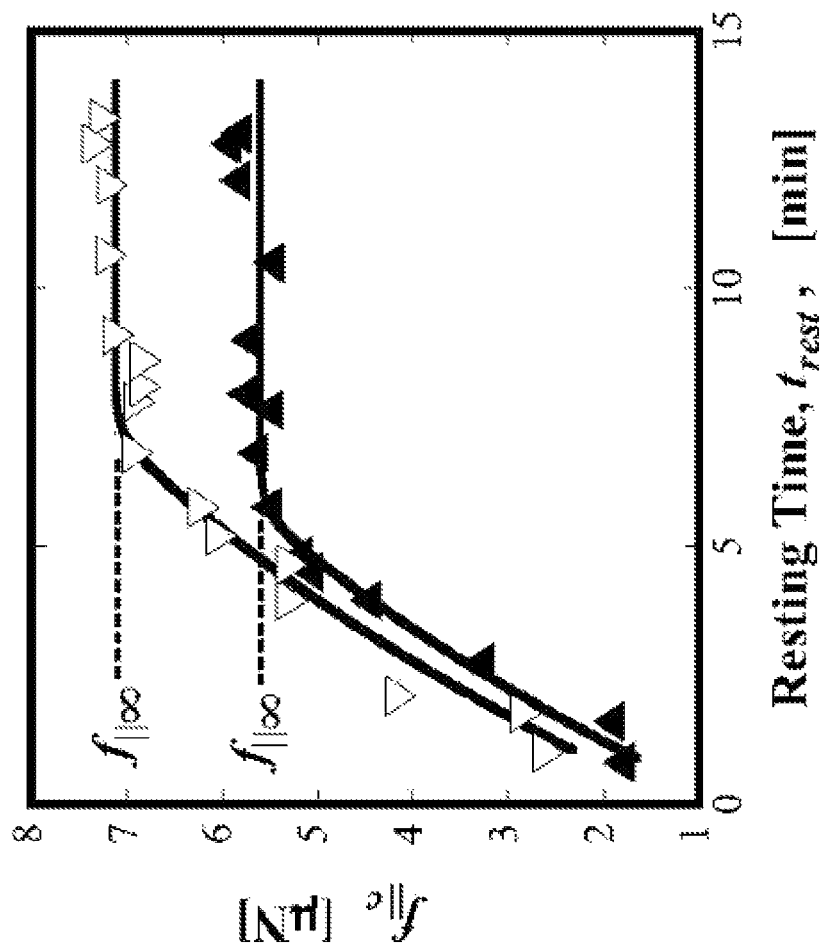
FIG. 5 shows an example retention force experiment result using the example CAB apparatus of FIG. 1.

FIG. 5 takes into consideration of drop size and absolute value of the normal force ($F\perp$=±mg), and shows the experiment results obtained using one CAB model. With the CAB system, both of the parameters can be varied. The results show the drop retention force, $F\|C$, required for the onset of lateral motion of a 3.3 µL of sessile (▲) and pendant (▽) hexadecane drops on an octadecyl trimethyl ammonium treated mica surface as a function of the time, trest, that the drop rested on the surface prior to sliding.

The effect of two normal forces (sessile and pendant cases) on the lateral forces required to slide the drops at various resting times are shown in FIG. 5, where the force F∥C, corresponds to the critical angular acceleration required to slide the drop: F∥C=mωC2L. FIG. 5 shows that the F∥C values (normalized by drop size) increase with the resting time for both sessile and pendant drops. However, the F∥C values for pendant drops are higher than those for sessile. This surprising phenomenon is emphasized as the times increases further to trest→∞ when both F∥C, pendant and F∥C, sessile plateau: These plateau values are significantly higher for pendant drops compared to same sized sessile drops.

This is counter intuitive if, for example, the intuition emanates from the Amonton law or Tabor's tribological ideas (according to the Amonton Law the shear forces are expected to be proportional to the normal forces, while in tribology, one expects that as the load increases, so does the contact area (as indeed happens in our system), and hence the shear forces are expected to grow with contact area. See D. Tabor, Proc. Inst. Mech. Eng. Part C-J. Eng. Mech. Eng. Sci. 205, 365 (1991). Or even according to more specific drop-surface theories (see for example E. B. Dussan, J. Fluid Mech. 151, 1 (1985)) where one expects the three phase contact line to be the main factor retaining the drop on the surface (the three phase contact line is longer for sessile drops than it is for pendant).

However, theories by de Gennes and Shanahan (M. E. R. Shanahan, and P.-G. de Gennes, Comptes Rendus Acad. Sci. II, 302, 517 (1986)) show that the unsatisfied component of the Young equation causes surface deformation which is proportional to $\gamma \sin \theta/r$ (r being the drop's radius). Later, Shanahan proved experimentally that the deformation is indeed directed towards the drop (protruding upwards for a sessile drop) (see A. Carre, J. C. Gastel, and M. E. R. Shanahan, Nature 379, 432 (1996)). This deformation is also associated with molecular reorientation of the solid surface which strengthens the liquid-surface interaction (minimizes the free energy associated with the liquid-surface interaction—see R. Tadmor et al., Langmuir 24, 9370 (2008) and P. S. Yadav et al., Langmuir 24, 3181 (2008)).

In line with the de Gennes—Shanahan approach, recent theories (see R. Tadmor, Surface Science 602, L108 (2008)) relate this stronger liquid-solid interaction to the pinning of drops to the surfaces by the proportionality: F∥C~$\gamma 2 \sin \theta(\cos \theta R - \cos \theta A)$. where the term $\gamma \sin \theta$ is related to the normal component which intensifies the intermolecular reorientation with time (see R. Tadmor J. Janik, J. Klein, L. J. Fetters, Phys. Rev. Lett. 99, 4 (2003)). For pendant drops the normal component of the Young equation has a higher value (since θ is higher) and hence the molecular reorientation is more significant and the resulting intermolecular force higher. Additionally, the gravitational force in the case of pendant drops acts in the same direction as the $\gamma \sin \theta$ and subsequently further enhances the solid-liquid intermolecular reorientation and resultant interactions while in the case of sessile drops the two forces act in opposite directions resulting in weaker deformation and weaker subsequent liquid-solid intermolecular reorientation and hence weaker interactions and smaller retention force.

Apparently, these factors overshadow the fact that the three phase contact line is longer for sessile drops compared to pendant. For example if we consider the angle throughout the still period (which constitute most of the rest period of the drop), we get for the sessile case: θS=33.0° (where the index "S" stands for sessile). Once that system reaches ωc, the corresponding advancing and receding angles are: θA, S=35.5°; θR,S=30.3°. For the same volume but pendant drop case the corresponding angles are: θP=37.1°; θA,P=40.0°; θR,P=34.7° (where the index "P" stands for pendant). Putting these values in equation (3) once for pendant and once for sessile and dividing, gives the ratio: sin θP(cos θR,P−cos θA,P)/sin θS(cos θR,S−cos θA,S)=1.26 which is in excellent agreement with the experimental force ratio F∥∞, pendant/F∥∞, sessile=1.27 (where F∥∞=F∥C1→∞). According to the nice agreement here and in other experiments that we conclude on this and other systems, the role of gravity to further the normal component and thus the intermolecular interactions seems negligible.

The agreement with theory this is the first experimental evidence of a smaller normal force resulting in a higher lateral force. It strengthens the realization that the CAB can provide unique measurements. Below we proceed with an example for measurements for which theory is still non-existent at all.

If different drop sizes and different normal forces are used, similar plots to FIG. 5 are still obtained though with different absolute values. Thus for a drop of 0.5 μl the ratio of F∥∞, pendant/F∥∞, sessile=1.09 only. We see that the lateral force required to slide the drop is higher when the normal force is lower.

Figure 6:
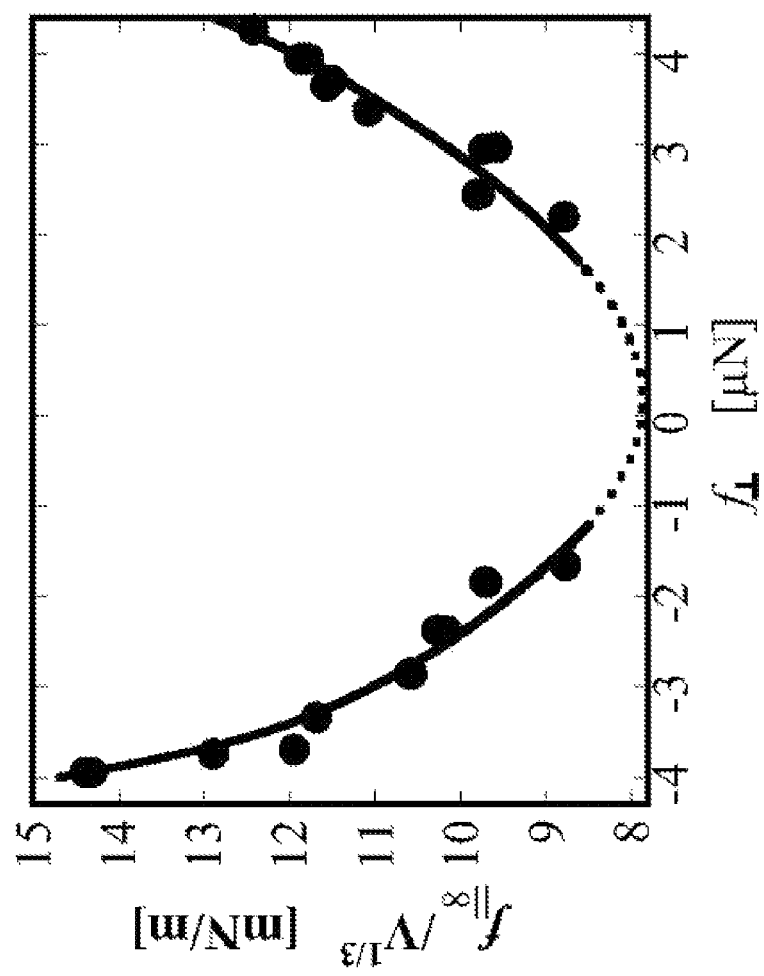
FIG. 6 shows a surprising experiment observation using the example CAB apparatus of FIG. 1.

The variation of the plateau value F∥∞ with the normal force, F⊥, for drop size of 0.5 μl is shown in FIG. 6. In agreement with FIG. 5, for the same absolute value |F⊥|, a greater F∥∞ is measured for the negative normal forces, i.e. F∥∞(−|F⊥|)>F∥∞(|F⊥|). However, strikingly, F∥∞ decreases as the absolute value of the normal force, |F⊥|, decreases whether F⊥ is positive or negative. Thus F∥ increases with F⊥ for positive F⊥, and decreases with F⊥ for negative F⊥ and reaches a minimum around F⊥=0. For this drop size, close to F⊥=0 the drop was unstable and F∥∞ could not be reached, however, we could verify the trend shown in dash line in FIG. 4A using smaller drop sizes (in smaller drops our current safety features do not allow the high RPM required for measurements far from F⊥=0).

The de Gennes-Shanahan approach used above for the pure pendant and pure sessile positions can explain the differences between F∥∞ pairs of similar F⊥ in FIG. 6, but not the decline in F∥∞ as F⊥→0.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. An apparatus for measuring retention force of an object body on a surface, comprising:
   a rotatable first arm having a first end and a second end, said second end being mounted on a vertical axis, wherein said rotating arm rotates around said vertical axis;

a cylinder assembly mounted on said first end, wherein a plate structure is rotatably mounted in the cylinder assembly so that said plate's relative angle to said arm is changeable, and a sample inset is fixedly mounted on said plate; and a recording means fixed on said plate, configured to record the object body placed on said sample inset.

2. The apparatus of claim 1, wherein said rotatable first arm is operatably connected with a motor and said motor rotates said arm when in operation.

3. The apparatus of claim 1, wherein said rotatable first arm is balanced with a second arm.

4. The apparatus of claim 1, wherein said rotatable first arm rotates 360 degrees in parallel to the Earth.

5. The apparatus of claim 1, further comprising an encoder for monitoring rotating speed of said rotatable first arm.

6. The apparatus of claim 1, wherein said recording means communicates wirelessly with a remote computer.

7. The apparatus of claim 1, wherein said recording means includes a light source and a camera.

8. The apparatus of claim 1, wherein said recording means is electronically connected with a computing device that calculates retention forces.

9. The apparatus of claim 1, wherein said plate's relative angle to said first arm is precisely controlled.

* * * * *